Jan. 21, 1947.  P. F. ADAIR ET AL  2,414,577
CARBURETOR VALVE
Filed Sept. 23, 1940  2 Sheets-Sheet 1

INVENTOR.
LEONARD E. BOGUE
PAUL F. ADAIR
BY
ATTORNEY.

Jan. 21, 1947.       P. F. ADAIR ET AL       2,414,577
CARBURETOR VALVE
Filed Sept. 23, 1940       2 Sheets-Sheet 2

INVENTOR.
LEONARD E. BOGUE
PAUL F. ADAIR
BY
ATTORNEY.

Patented Jan. 21, 1947

2,414,577

UNITED STATES PATENT OFFICE 2,414,577

CARBURETOR VALVE

Paul F. Adair and Leonard E. Bogue, South Bend, Ind., assignors to Bendix Aviation Corporation, South Bend, Ind., a corporation of Delaware Application September 23, 1940, Serial No. 357,844

14 Claims. (Cl. 137—104)

This invention relates to carburetors and more particularly to valve elements therefor which control either fuel, vapor, or air passages; and is particularly concerned with the solution of the problem of undesirable leakage past a valve, such as a float type fuel inlet valve or an air or vapor vent valve, when the carburetor is subjected to severe vibrations resulting from the operation of the engine.

A tapered metallic valve cooperating with a metallic seat, as has generally been used in carburetors, will close the passage only when the valve is in one position and any tilting of the valve in the seat, such as will occur with lateral vibration, or any movement whatever of the valve member relative to the seat results in a partial opening of the valve and leakage therepast.

In float type carburetors it has been found that engine vibration and road shocks transmitted through the vehicle to the carburetor cause the float, due to its inertia, to oscillate in a vertical plane even though the fuel in the fuel chamber is at or above normal level. Because of the metallic needle and seat and the rigid float hanger assembly, float oscillation is necessarily restricted to movement from a closed fuel inlet valve position to a partially open one. When the engine is consuming fuel at a low rate, as at idle or slow speed, engine vibration and road shocks transmitted to the carburetor may cause the valve to be open a sufficient portion of the time to admit more fuel than is being consumed, in which case the level in the float chamber will rise and fuel may overflow from the float chamber vent.

In aircraft engines employing a pressure type carburetor, such as is disclosed in the pending F. C. Mock application, Serial Number 202,206, filed April 15, 1938 and issued as Patent No. 2,390,658 on December 11, 1945, vapor and air escape valves of the float controlled needle type are generally used. With metallic valves of conventional type the engine vibration causes the valve to vibrate and results in the more or less continuous discharge of liquid fuel through the vapor escape valve instead of mere leakage of vapor when and if it forms. This fuel is generally returned to the supply tanks and is not lost or expelled in a region where it might be a fire hazard; however, there are a number of reasons which individually are relatively minor but collectively make it highly desirable to eliminate leakage of fuel past the vapor vent valve.

Another disadvantage arising in devices of this character is that a metallic needle and seat are generally assembled and staked, by tapping the needle against the seat, to form a matched pair of elements, both of which must be replaced by a similarly prefitted and assembled unit if one part fails. Consequently, service of these parts is unduly expensive.

Also, a metallic valve and seat, particularly if there is the slightest scratch or flaw in either the valve or seat, requires a relatively high valve actuating force to completely seal the passage. Moderately large floats are therefore required to produce the necessary actuating force and as a consequence relatively large fuel reservoirs are required to accommodate the large float, thus increasing the cost of the carburetor.

It is therefore one object of this invention to provide an improved fuel inlet control valve for a carburetor which may be vibrated without affecting the seating of the valve.

Another object of the invention is to provide a carburetor valve element having a tip made of deformable material such that the valve may vibrate laterally relative to the seat without interfering with the sealing of the valve.

Another object of the invention is to provide a carburetor valve element having a compressible core such that the element may move a slight amount toward and away from the seat without interfering with the sealing of the valve.

Another object is to provide a deformable needle valve element that will seal the opening in any seat designed to cooperate with it without prefitting.

Another object of the invention is to provide a needle valve element which will be completely interchangeable and replaceable.

Another object of the invention is to provide a carburetor valve element made of gasoline-resistant, rubber-like material which is resilient but has sufficient hardness to permit grinding the valve to a true taper.

Still another object of the invention is to provide a carburetor valve element composed of a metallic sleeve and a rubber-like core which is locked in the sleeve at the time of molding.

A further object of the invention is to provide a carburetor valve element which will seal a passage with but a moderate actuating force.

Other objects and advantages will be apparent to those skilled in the art from the following description taken in connection with the appended drawings in which.

Figure 1:
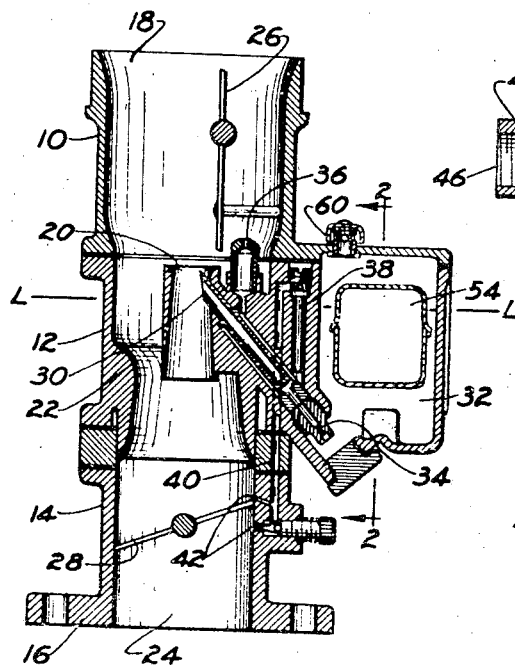
Figure 1 is an elevational view in section of a float type carburetor embodying the invention.

With particular reference to Figure 1 there is shown a carburetor having an air horn section 10, a main body section 12, and a throttle body section 14 having a flange 16 for attaching the carburetor to an intake manifold (not shown) of an internal combustion engine. The carburetor induction passage comprises an air inlet 18, primarily venturi 20, secondary venturi 22 and mixture outlet 24. The air inlet 18 is controlled by a choke valve 26 which may be operated manually or by known automatic means. A throttle valve 28 controls the mixture outlet.

A main fuel nozzle 30 receives fuel from a constant level reservoir 32 through a metering orifice 34 and discharges in the primary venturi 20, air being bled to the nozzle through air bleed 36 in the known manner. Idling fuel is supplied to the induction passage through idling tube 38, passage 40, and idle discharge ports 42.

Figure 2:
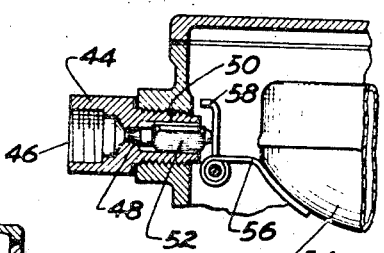
Figure 2 is an enlarged partial view in section taken on the line 2—2 of Figure 1.

The reservoir 32, formed in the main body section, has a threaded aperture adapted to receive a fuel inlet fitting 44, as shown in Figure 2. The fitting 44 comprises an inlet passage 46 adapted to be connected to a fuel supply line, a valve seat 48, and an outlet passage 50 adapted to receive, support and guide a flat-sided fuel inlet valve indicated at 52. Although the valve shown is of the three-sided type it obviously may have any shape or form capable of being guided by the fitting and yet permitting the fuel to reach the fuel reservoir. A float 54 is connected, as by soldering, to a pivotally mounted hanger 56 having an arm 58 adapted to cooperate with valve 52 to maintain the fuel at the level L—L. A vent 60 is provided to vent the reservoir 32 to atmosphere; however, it will be apparent that the reservoir could be vented to the air inlet 18, in the known manner, if desired.

Figure 3:
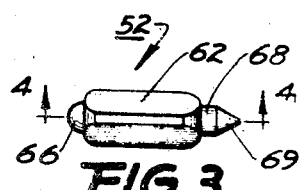
Figure 3 is a plan view of the float valve of Figure 2.
Figure 4:
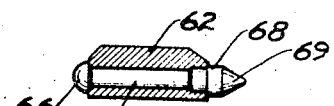
Figure 4 is a sectional view taken on the line 4—4 of Figure 3.

The fuel inlet valve 52, as shown in Figures 3 and 4, is composed of a flat-sided metallic body member 62 and a cylindrical core 64 of synthetic rubber-like material having an enlarged hemispherical portion 66 at one end and an enlarged cylindrical portion 68 terminating in a tapered portion 69 at its other end. The enlarged ends 66 and 68 serve to lock the core 64 in the body 62. Other retaining means could be employed to lock the core into the body, such for example, as irregular retaining recesses in the body or a cross passage intersecting the central bore into which the rubber-like material extends.

The core 64 is formed of uncured synthetic rubber-like material and is then cured. The synthetic rubber-like material may be any material, such for example, as neoprene or Thiokol, which is impervious to or substantially unaffected by gasoline and is capable of being molded in the uncured state and then cured. The material, following curing, should be sufficiently resilient that the tapered portion 69 and adjacent cylindrical portion 68 may be readily deformed to permit the valve to seat even when subjected to vibration. If but a moderate degree of concentricity is required between the tapered portion 69 and the valve body the valve as molded and cured may be used without further finishing. However, if a high degree of concentricity is required the tapered portion may be ground after curing. It has been found that if the durometer hardness of the cured material is between 40 and 90 the material will be sufficiently elastic to permit the valve to seal under vibration and will be sufficiently hard to readily permit accurate grinding of the tapered portion. The resilient or compressible core also acts as a flexible connection between the float hanger arm 58 and the valve seat 48 and permits the float to oscillate through small distances without unseating the valve.

Figure 5:
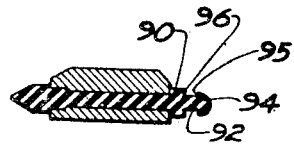
Figure 5 is an enlarged sectional view of a modified form of float valve.

The modification of Figure 5 is similar to that of Figure 4 except that the right end (as shown) of the synthetic rubber core includes an enlarged cylindrical portion 90, a reduced neck-like portion 92, and a rounded or tapered end 94. The neck 92 may either be molded in the core by the use of a slide type of mold or may be ground in the core after curing. Shoulders 95 and 96 are thus provided, the shoulder 95 preferably being smaller than shoulder 96.

Figure 6:
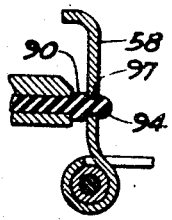
Figure 6 is an enlarged partial view in section of the valve of Figure 5 and the float hanger arm.

The float hanger arm 58 is provided with an aperture somewhat smaller than the diameter of the end 94 but slightly larger than the diameter of the neck 92. Also, the thickness of the arm 58 is preferably somewhat less than the length of the neck 92. The valve and arm may be assembled as shown in Figure 6 by applying a moderate force urging the end 94 through the aperture 97. The valve and arm may also be disassembled by applying a somewhat greater force to separate the two, the end 94 deforming under the force to allow the end 94 to be pulled through the aperture 97.

During periods of operation the arm 58 will bear against the shoulder 96 in closing the valve. If the valve should tend to stick or remain seated when the fuel level drops the arm 58 will act against the shoulder 95 to urge the valve open.

Figure 7:
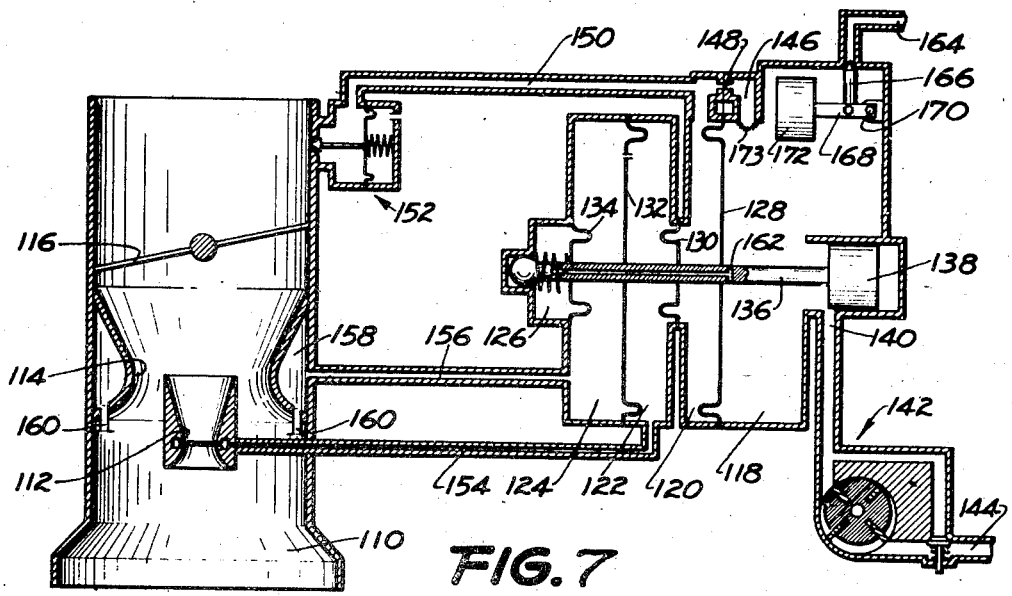
Figure 7 is a diagrammatic view of a pressure feed carburetor embodying another form of the invention.
Figure 8:
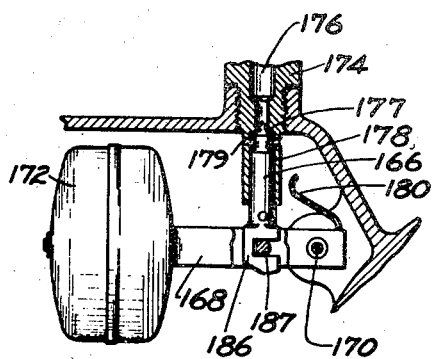
Figure 8 is an enlarged partial view in section of the vapor vent valve and float operated mechanism.

In Figure 7 is diagrammatically shown a pressure feed carburetor of the type disclosed in the above mentioned patent to F. C. Mock. The induction passage includes an air inlet 110, a primary venturi 112, a secondary venturi 114 and a throttle 116 for controlling the air supply to the engine, the fuel supply being controlled by a metering unit to be presently described.

The fuel metering unit comprises five chambers: 118, 120, 122, 124 and 126 separated from each other by four diaphragms: 128, 130, 132 and 134 connected to a control rod 136 having a slide valve 138 attached to its right-hand end (as shown) for controlling the fuel inlet passage 140 leading from a fuel pump of conventional design and generally indicated at 142. Fuel is received by the pump from a fuel source as a fuel tank through the conduit 144 and is delivered to the metering unit through passage 140. The fuel then flows through passage 140, past the valve 138, into the unmetered fuel chamber 118, through the passage 146, metering orifice 148, into the metered fuel chamber 120, and through the passage 150 to a pressure responsive discharge nozzle indicated generally at 152, whence it is discharged into the induction passage posterior to the throttle.

The air chamber 122 is connected through the passage 154 with the throat of the primary venturi 112. The air chamber 124 is connected through passage 156, chamber 158 and tubes 160 with the air inlet. The chamber 126 is connected with the unmetered fuel chamber 118 by means of a passage 162 in the control rod 136.

During operation, the air flow through the induction passage creates a differential in pressure between the throat of venturi 112 and the air inlet which varies as the square root of the quantity of air flowing. The pressure in venturi 112 and that in the air inlet are respectively transmitted to the chambers 122 and 124 and create a force on diaphragm 132, urging the control rod 136 and valve 138 to the right, which is likewise proportional to the square root of the quantity of air flowing. Fuel flow through the metering unit creates a drop in pressure across the orifice 148 which is proportional to the square root of the quantity of fuel flow. The unmetered and metered fuel pressures acting on opposite sides of the diaphragm 128 create a force on the control rod 136 to the left which is likewise proportional to the square root of the quantity of fuel flow. The control rod 136 and valve 138 will assume a position under the action of the air force such that an equal but opposite fuel force is present on the control rod. Since the air force and fuel force are maintained equal and each bears a fixed relation to the quantities of air and fuel flow respectively, a constant ratio of air to fuel will be maintained.

In closed pressure feed systems of the type shown in Figure 7 any vapor which forms anterior to the metering orifice 148, unless special means are provided to eliminate it, will pass through the orifice. The metering unit maintains the desired differential pressure across the metering orifice at all times but, as will be apparent, when vapor is being metered the weight of fuel flowing is greatly reduced as compared to that when liquid is being metered. As a result, if vapor reaches the metering orifice the mixture delivered to the engine will be excessively lean and will cause the engine to misfire or may cause the engine to stop operating altogether.

To prevent vapor from reaching the metering orifice a vapor vent passage 164 is provided in the uppermost portion of the unmetered fuel chamber 118 and preferably leads back to the fuel tank to eliminate any fire hazard which release of fuel vapor in the vicinity of the carburetor might otherwise cause. A valve indicated generally at 166 controls the inlet to passage 164 and is pivotally connected to a float hanger 168 which is pivoted at one end 170 to the body of the metering unit and connected at its other end to a float 172. A fine mesh screen 173, which offers a substantial resistance to the passage of vapor bubbles therethrough, is provided at the entrance to passage 146 to deflect therefrom any vapor bubbles tending to enter the passage 146.

Figure 9:
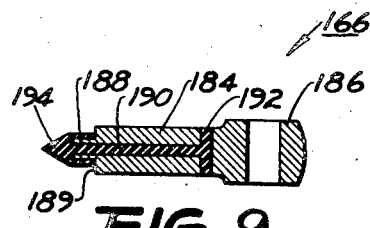
Figure 9 is an enlarged sectional view of the valve of Figure 8.

As is best shown in Figure 9 a vapor outlet fitting 174 is threaded into an aperture in the body of the metering unit and includes an outlet passage 176, a valve seat 177 and a cylindrical portion 178 which slidably receives the valve 166 and is apertured at 179. The float hanger 168 is provided with an extension 180 adapted to engage the cylindrical portion 178 to limit the downward movement of the float 172.

The valve 166 comprises a metallic body having a cylindrical stem 184 and an enlarged bifurcated head 186 adapted to receive a pin 187 mounted in the float hanger 168. A two-way connection is thus provided between the float and valve such that the float may positively open or close the valve. The stem 184 is reduced in diameter at 188 to form a shoulder 189 and contains a central bore 190 and a cross passage 192. Synthetic rubber-like material, which has been formed while in the plastic or uncured state and then cured, fills the passage 190, the cross passage 192, and surrounds the cylindrical portion 188, terminating in a tapered tip 194. The rubber-like core is thus locked into the metal body of the valve. The cured synthetic rubber-like material preferably has a hardness which will permit grinding of the tapered tip to obtain concentricity of the tip and stem but is sufficiently elastic to permit the tip to deflect relative to the metallic valve body, thus allowing the valve body 184 to vibrate without unseating the valve tip 194.

Although the invention has been particularly described with reference to but two modifications it will be readily apparent that the invention is not limited thereto or otherwise than in accordance with the subjoined claims.

We claim:

1. In a carburetor, a float having a valve operating lever, and a valve comprising a metallic seat and a valve member including a metallic sleeve and a body of resilient or rubber-like material therein and projecting at each end to engage said seat and said lever, respectively, for absorbing vibrations imparted to the valve member.

2. In a carburetor valve, a valve member including a metallic sleeve having a portion of reduced diameter at one end, and a body of resilient rubber-like material molded into said sleeve and over the reduced diameter portion and formed with a tapered end beyond said reduced diameter portion.

3. In a carburetor valve, a metallic body having a bore therethrough, a body of rubber-like material molded in said bore and having enlarged portions adjacent the ends of the metallic body, one of said portions being adapted to cooperate with a valve seat, and means engaging the other of said portions for actuating the valve.

4. In a carburetor valve, a valve member including a metallic sleeve having a portion of reduced diameter at one end, and a body of resilient rubber-like material molded into said sleeve and over the reduced diameter portion and formed with an end beyond said reduced diameter portion adapted to cooperate with a valve seat, said metallic sleeve having a side passage into which the body of rubber-like material extends to lock said body in the sleeve.

5. A carburetor float valve comprising a metallic member, a passage therethrough, a body of rubber-like material molded in said passage and projecting therefrom at each end, said body being adapted at one end to cooperate with a valve seat and at the other to engage a float actuated lever.

6. A carburetor float valve comprising a metallic member, a rubber-like projection extending from said member, and a reduced neck-like portion in said projection adapted to receive an operating lever to form a connection therewith.

7. In a carburetor subjected to vibrations of an internal combustion engine, a float operated valve including a metallic member having an orifice-like valve seat, and a valve element having a metallic body and a central core of substantial length in the metallic body, said core being of resilient gasoline-resistant rubber-like material projecting beyond the end of said body and terminating in a conical tip adapted to project into and engage the orifice-like seat, whereby vibrations transmitted to the said element may be absorbed without disturbing the tip relative to the seat.

8. In a fuel feeding device, a valve seat element comprising a metallic member having a passage therethrough including a cylindrical bore forming a guide portion and a cylindrical bore of reduced diameter forming a seat, said bores being coaxial, and a float-operated valve member comprising a metallic body closely receivable in and slidable within said guide portion, a central bore in said metallic body, and a body of resilient synthetic rubber-like material of substantial length and substantially impervious to hydrocarbon liquids anchored in said bore and formed with a tapered end beyond said body adapted to engage said seat.

9. In a fuel feeding device, a valve seat element comprising a metallic member having a passage therethrough including a cylindrical bore forming a guide portion and a cylindrical bore of reduced diameter forming a seat, said bores being coaxial, and a float operated valve member comprising a metallic sleeve having a portion of reduced diameter at one end, and a body of resilient rubber-like material molded into said sleeve and over the reduced diameter portion and forming a tapered end beyond said reduced diameter portion adapted to cooperate with the seat, said valve member being closely receivable in and slidable within said guide portion.

10. In a carburetor valve, a valve member including a metallic sleeve having a portion of reduced diameter at one end and a body of resilient rubber-like material permanently fixed in said sleeve and over the reduced diameter portion and formed with a tapered end beyond said reduced diameter portion.

11. In a carburetor valve, a metallic valve body, a longitudinal bore of substantial length in said body, a transverse bore in said body intersecting the longitudinal bore, and a body of resilient rubber-like material anchored within said bores and extending beyond the end of the metallic body thereby permanently securing the parts of said valve together.

12. In a carburetor valve, a metallic valve body, a longitudinal bore of substantial length in said body, a transverse bore in said body intersecting the longitudinal bore, and a body of rubber-like material anchored in said bores and extending beyond the end of the body.

13. A valve member comprising a metallic cylindrical member terminating at one end in an enlarged bifurcated head, a centrally disposed longitudinally extending bore of substantial length in said member, a transverse bore in the member intersecting said longitudinal bore, and a body of resilient rubber-like material secured in said bores and having a portion projecting beyond the end of the member and terminating in a conical tip.

14. In a carburetor valve, an elongated metallic body, a longitudinal passage of substantial length in said body, a body of resilient rubber-like material filling said pasasge, and means for permanently securing said valve parts together, said rubber-like body having a relatively short tip portion extending from the longitudinal passage beyond one end of the metallic body.

PAUL F. ADAIR.
LEONARD E. BOGUE.

Certificate of Correction

Patent No. 2,414,577.                                                                 January 21, 1947.

PAUL F. ADAIR ET AL.

It is hereby certified that errors appear in the printed specification of the above numbered patent requiring correction as follows: Column 3, line 25, for "primarily" read *primary*; column 6, lines 34, 35, and 36, after "respectively" strike out the comma and words ", for absorbing vibrations imparted to the valve member"; and that the said Letters Patent should be read with these corrections therein that the same may conform to the record of the case in the Patent Office.

Signed and sealed this 2nd day of November, A. D. 1948.

[SEAL]

THOMAS F. MURPHY,
*Assistant Commissioner of Patents.*